United States Patent [19]

Murase

[11] 4,416,923

[45] Nov. 22, 1983

[54] METHOD OF MANUFACTURING POLYESTER FIBERS WITH GOOD ADHESIVENESS TO RUBBER USING AMINOSILANES AND EPOXY COMPOUNDS IN A YARN FINISH

[75] Inventor: Shigemitsu Murase, Joyo, Japan

[73] Assignee: Unitika Ltd., Hyogo, Japan

[21] Appl. No.: 416,820

[22] Filed: Sep. 13, 1982

[30] Foreign Application Priority Data

Feb. 15, 1982 [JP] Japan .................................. 57-23436

[51] Int. Cl.³ ............................................... B05D 3/02
[52] U.S. Cl. .................................... 427/387; 252/8.8; 252/8.9; 427/386
[58] Field of Search ................................. 252/8.8, 8.9; 427/389.9, 386, 387

[56] References Cited

U.S. PATENT DOCUMENTS

| | | | |
|---|---|---|---|
| 3,756,972 | 9/1973 | Kobayashi et al. | 252/8.9 |
| 4,070,152 | 1/1978 | Pentz | 252/8.8 X |
| 4,311,737 | 1/1982 | Ishizaka et al. | 427/386 |
| 4,341,669 | 7/1982 | Marco et al. | 427/386 X |
| 4,356,219 | 10/1982 | Boon et al. | 427/386 |
| 4,374,031 | 2/1983 | Kudo et al. | 252/8.8 |
| 4,378,389 | 3/1983 | Maruyama et al. | 427/387 |

*Primary Examiner*—Thurman K. Page
*Attorney, Agent, or Firm*—Richard A. Anderson

[57] ABSTRACT

Method of manufacturing polyester fibers with good adhesiveness to rubber, characterized in that in the process of making polyester fiber into yarn, a yarn-making oil (spin finish) containing an epoxy compound and an alkylene oxide adduct of an amine compound containing an alkoxysilane group is added to the polyester fiber, and it is then heat-treated.

17 Claims, No Drawings

METHOD OF MANUFACTURING POLYESTER FIBERS WITH GOOD ADHESIVENESS TO RUBBER USING AMINOSILANES AND EPOXY COMPOUNDS IN A YARN FINISH

BACKGROUND OF THE INVENTION

This invention concerns a method of manufacturing polyester fibers with good adhesiveness to rubber.

Polyester fibers, represented by polyethylene terephthalate, are fibers with excellent physical and chemical properties; they are produced industrially in large quantities and are very useful in various fields. They are also extremely useful as reinforcing materials for rubber.

However, when compared with polyamide fibers such as nylon 6, nylon 6,6, etc., which are other typical industrial fibers, polyester fibers have the great defect that they are inferior in adhesiveness to rubber.

That is, polyamide fibers become fibers with very good adhesiveness to rubber simply by being treated with a resorcinol-formalin-latex rubber (RFL) adhesive agent, but in the case of polyester fibers good adhesiveness cannot be obtained even with the RFL treatment.

For this reason, many attempts have been made for some time to improve the adhesiveness of polyester fibers with rubber. Typical of such methods is the method in which, when the raw cord fiber is RFL-treated (the so-called "dipping" treatment), it is first pretreated with an adhesive agent such as an epoxy compound, as isocyanate compound, or an ethylene urea compound, etc., or it is dip treated with RFL which contains an esterophilic ingredient such as a novolak resin, 2,6-bis(2′,4′-dihydroxyphenyl methyl-4-chlorophenol, known by the trade name "Pexul"; or the method in which at the yarn stage an adhesive agent such as an epoxy compound, an isocyanate compound, or an ethylene urea compound, etc., is added, and it is then dip-treated with RFL. The former method, while the desired adhesiveness is obtained to some extent, has the defect that it causes an increase in cost because the quantity of adhesive agent used is large, the treatment method is complicated and troublesome, etc. The latter method has the practical advantage that the later dipping treatment can be performed with RFL alone, as in the case of polyamide fibers, but it has the defect that the desired adhesive function is somewhat unsatisfactory. Consequently, particularly in the case of the latter method, a new problem is caused in that the method of treating the yarn itself must be performed in such a way that it greatly deviates from the practical range in order to increase the adhesive function. The concentration of the adhesive agent in treating the yarn is markedly increased, the heat treatment conditions are made extremely severe, etc.

SUMMARY OF THE INVENTION

This invention is a method which makes possible the manufacturing of polyester fiber which shows good adhesiveness to rubber by the very simple method of adding epoxy compounds etc., at the same time the yarn-making oil (spin finish) is added, at the time of spinning the polyester fibers, and heat treating using the heat treatment of the subsequent drawing process, after which only RFL treatment is performed.

That is, the first invention is characterized in that in the process of spinning a polyester fiber, a yarn-making oil (spin finish) is added to the fiber which contains an epoxy compound and an alkylene oxide adduct of an amine compound containing an alkoxysilane group (called below "aminosilane compound"), and the fiber is then heat-treated. The second invention is characterized in that the yarn-making oil (spin finish) in the first invention also contains a polymerization catalyst for an alkoxysilane group.

By the method of this invention, the adhesiveness is increased to a surprising degree without requiring a severe heat treatment. Especially with the method of the second invention which also uses a polymerization catalyst, the heat treatment temperature can be lowered.

Also by the method of this invention, the lowering of workability caused by poor slipperiness of the yarn, which is due to adding the epoxy compound, is prevented, and the defect that the cord becomes hard after the dipping treatment is improved.

The epoxy compound in this invention is ordinarily synthesized by reacting a halogen-containing epoxy compound, e.g., epichlorohydrin, and a polyhydric alcohol or polyhydric phenol. Examples of this kind of polyhydric alcohol or polyhydric phenol are polyhydric alcohols such as glycerol, ethylene glycol, diethylene glycol, propylene glycol, sorbitol, polyethylene glycol, polypropylene glycol, trimethylol propane, or their derivatives, etc., or polyhydric phenols such as resorcinol, catechol, hydroquinone, or their derivatives, etc. Moreover, one can also use cyclohexane epoxide, diglycidyl ether, etc., which are obtained by oxidizing unsaturated bonds with peracetic acid, etc. It is preferable to use epoxy compounds with alkoxysilane groups, such as beta-(3,4-epoxycyclohexyl)ethyl triethoxysilane, gamma-glycidoxypropyl trimethoxysilane, etc. These are desirable from the points of view of their compatibility with aminosilane compounds, reactivity, etc.

The aminosilane compounds in this invention are obtained by adding one or more alkylene oxides, such as ethylene oxide, propylene oxide, isobutylene oxide, etc., to aminoalkyl alkoxysilanes expressed by the following formulas (1) or (2):

$$(R_1O)_3Si—R_2—NH_2 \tag{1}$$

$$(R_1O)_3Si—R_2—NH—R_3—NH_2 \tag{2}$$

(where $R_1$ is a lower alkyl group, and $R_2$ and $R_3$ are alkylene groups).

The number of mols of alkylene oxide added which is suitable for the purposes of this invention is 50 or less.

These compounds have good adhesiveness to the fiber, and when they are added to the fiber it is observed that a film is formed by dealcohol-condensation of the alkoxysilane group when heat treatment is performed. Since they have hydroxyl and tertiary amino groups, they also have the advantage that they also act as hardening catalysts for the epoxy compound.

Examples of polymerization catalysts for alkoxysilane groups are lithium nitrate, calcium nitrate, zinc nitrate, sodium borofluoride, zinc borofluoride, etc.

The yarn-making oil containing epoxy compounds, etc., contains natural oils such as mineral oil, coconut oil, rapeseed oil, sperm oil, etc., or synthetic oils such as esters of higher alcohols or polyhydric alcohols and higher fatty acids, etc., as lubricating agent ingredients, and also surface active agents to emulsify and disperse these lubricating agent ingredients, as well as, when necessary, static prevention agents, heat-resistant agents, coloring agents, etc. There is no necessity to use surface active agents as emulsifying and dispersing agents, but in general it is preferable to use castor oil, higher alcohol alkylene oxide additive, or polyethylene glycol or esters of polyethylene glycol and higher fatty acids, etc. Of course, such surface active agents can also serve as emulsifying and disposing agents of the epoxy compound, etc.

The proportions of the ingredients of the yarn-making oil should be 20-70 weight percent lubricating agent, 5-50 weight percent epoxy compound, 3-30 weight percent aminosilane compound, 0.01-2 weight percent polymerization catalyst, 10-50 weight percent emulsifier, and suitable quantities of the other additives to make 100 weight percent.

If the composition of the mixture is in this range, the aimed-for effect of increasing the adhesiveness is well demonstrated, without losing the original functions of the yarn-making oil; lubrication and cohesion of strands.

The polyester in this invention is a polycondensation of a compound having two ester-forming OH groups, typified by ethylene glycol, and a compound having two ester-forming carboxyl groups, typified by terephthalic acid; a typical example is polyethylene terephthalate. However, this polyester is not limited to a homopolymer; it may also be copolymer, and a compound with three or more ester-forming groups (within a range which does not hinder the fiber-forming ability) may also be used as a copolymer ingredient.

The yarn-making process mentioned herein refers to the process of spinning-winding-drawing-winding; of course, it is also possible to use the spindraw mode, in which the spinning and drawing process are directly connected. At any desired stage in this process, the yarn-making oil (spin finish) can be added by the roller method, the immersion method, the spray method, etc. The yarn-making oil (spin finish) is ordinarily used in the form of an aqueous emulsion, but it can also be used as a straight oil, diluted with low-viscosity mineral oil, etc. if dispersion and emulsification of the adhesive are possible. The addition of the oil may be performed two or more times; it is preferable to do this in such a way that the total quantity of oil added is 0.2-2 weight percent. It is also possible to use a treatment with an oil in which part or all of the epoxy compound, the aminosilane compound, and the polymerization catalyst are not contained, along with the yarn-making oil (spin finish) of this invention. After the addition, heat treatment at 150°-250° C. for 0.05-several seconds is performed. The method of the heat treatment may be one which uses a hot plate, hot roller, slit heater, oven, etc. This heat treatment is one which can correspond fully with the drawing process time; in other words, the heat treatment conditions of the drawing process are themselves the conditions required for the heat treatment of this invention, so that it may be considered extremely practical. The simplest application of the method of this invention is to use the yarn-making oil (spin finish) of this invention itself as the spinning oil, and then performing the ordinary heat drawing treatment. This invention, therefore, has the great advantages that it can be used as the yarn-making oil (spin finish) and that severe heat treatment conditions such as those of the conventional methods are not needed.

Of course, there are no limits on the molecular weight, denier, number of filaments, cross-section form, yarn properties, fine structure, presence or absence of additives, polymer properties (concentration of terminal carboxyl groups, etc.).

The polyester fiber obtained by the method of this invention is given very good adhesiveness to rubber simply by the usual method of performing the ordinary RFL treatment after twisting the yarn and forming the fabric.

The increase in adhesiveness of this kind not only improves the polyester fiber itself, but also is directly connected with an improvement in the quality of the rubber which is reinforced.

This invention will be explained in detail in the following by means of actual examples. The measurement of the intrinsic viscosity in these actual examples was performed in a mixed solvent of phenol/tetra-chloroethane (weight ratio 1/1) at 20° C.

The measurement of the adhesive force with the rubber was performed by the method described below. Original yarn→raw cord formation (twisting, twining together)→dip cord formation (dip treatment)→embedding in rubber and vulcanizing→measurement of adhesive force between the cord and the rubber.

Here the manufacturing of the raw cord was performed by the method of twisting at 40 times/10 cm with a ring twisting machine, taking two of these together, and again twisting at 40 times/10 cm.

The dip treatment was performed under the following conditions:

|  | Parts |
|---|---|
| Solution A |  |
| Resorcin | 15 |
| Formalin | 20 |
| Caustic Soda | 0.4 |
| Water | 290 |
| Solution B |  |
| Vinyl Pyridine Butadiene-Styrene Latex Solution (40%) | 240 |
| Butadiene-Styrene Latex (40%) | 80 |
| Water | 347 |

After Solution A was cured at 25° C. for 6 hours, and Solution B at 25° C. for 4 hours, the two solutions were mixed and cured again at 25° C. for 12 hours.

| Dipping Conditions |  |
|---|---|
| Target Quantity of Dip Added (Solids Basis) | 5 Percent |
| Drying Zone | 80° C. × 30 Seconds |
| Curing Zone (2 Chambers) | 230° C. × 80 Seconds × 2 Times |

The method of vulcanizing was as follows. The dipped cord was embedded in unvulcanized rubber, the principal ingredients of which were 30 parts smoked sheet, 70 parts styrene-butadiene rubber, 40 parts carbon black, 5 parts zinc oxide, 15 parts stearic acid, 1 part phenyl-beta-naphthylamine, 0.3 part phthalic anhydride, 0.8 part vulcanization accelerator, 0.15 part diphenylguanidine, and 2 parts sulfur, in an H test mold. It was then vulcanized and adhesion-treated under pressure at 140° C. for 40 minutes.

The method of measuring the adhesive force was the so-called H test method; i.e., the load required to pull the cord from rubber 1 cm thick was measured.

REFERENCE EXAMPLE (Synthesis of Aminosilane Compound)

2.2 Parts by weight distilled 3-aminopropyltrimethoxysilane and 10 parts by weight ethylene oxide were prepared at 0° C. and placed in a pressure reactor fitted with a stirrer, under a dry nitrogen atmosphere. After heating and stirring at 70° C. for 48 hours, the solution was cooled and the reaction product was removed under a dry nitrogen atmosphere. Distilled, dehydrated chloroform was added and the reaction product dissolved; then it was filtered, and the chloroform was removed under reduced pressure. A product consisting of 8.7 parts by weight of a pale yellow waxy substance was obtained.

This product was a compound in which 15 mol ethylene oxide was added per mol of 3-aminopropyltrimethoxysilane (this compound is called "aminosilane compound I").

In the same manner, a compound was synthesized with 18 mols ethylene oxide added to N-2-aminoethyl-3-aminopropyltrimethoxysilane ("aminosilane compound II"), and a compound with 30 mols ethylene oxide added ("aminosilane compound III").

These aminosilane compounds were dissolved in a mixed solvent of water and isopropanol, and then added to the oil.

Next, the compositions of the yarn-making oils (spin finish) used in the actual examples are shown in Table 1.

TABLE 1

| Ingredient | Oil Number |  |  |  |  |  |
|---|---|---|---|---|---|---|
|  | 1 | 2 | 3 | 4 | 5 | 6 |
| Rapeseed Oil | 30 | — | — | — | 40 | — |
| Isostearyl Palmitate | — | 30 | 30 | 30 | — | 40 |
| POE (20) Castor Oil | 10 | — | — | 5 | 10 | — |
| POE (15) Monooleate | — | 10 | 10 | 10 | — | 10 |
| PEG (Molecular Weight 400) Monooleate | 10 | 15 | 15 | 10 | 15 | 15 |
| Epikote 812 | 30 | 10 | 10 | — | 30 | 10 |
| Gamma-glycidoxypropyl-trimethoxysilane | — | 20 | 20 | 30 | — | 20 |
| Aminosilane Comp. I | 20 | — | — | 15 | — | — |
| Aminosilane Comp. II | — | 15 | — | — | — | — |
| Aminosilane Comp. III | — | — | 15 | — | — | — |
| Calcium Nitrate | — | — | — | — | — | — |
| Meta-phenylene Diamine | — | — | — | — | 0.3 | 0.3 |
| Lauryl Phosphate-K | — | — | — | — | 4.7 | 4.7 |

| Ingredient | Oil Number |  |  |  |  |
|---|---|---|---|---|---|
|  | 7 | 8 | 9 | 10 | 11 |
| Rapeseed Oil | — | 30 | — | — | — |
| Isostearyl Palmitate | 40 | — | 30 | 30 | 30 |
| POE (20) Castor Oil | — | 10 | — | — | — |
| POE (15) Monooleate | 10 | — | 10 | 10 | 20 |
| PEG (Molecular Weight 400) Monooleate | 15 | 10 | 15 | 15 | 5 |
| Epikote 812 | — | — | 10 | 20 | 30 |
| Gamma-Glycidoxypropyl-trimethoxysilane | 30 | 30 | 20 | 10 | — |
| Aminosilane Compound I | — | 15 | 10 | — | 10 |
| Aminosilane Compound II | — | — | — | — | — |
| Aminosilane Compound III | — | — | — | 10 | — |
| Calcium Nitrate | — | 0.2 | 0.5 | 0.5 | 0.5 |
| Meta-Phenylene Diamine | — | 0.3 | 0.3 | — | — |
| Lauryl Phosphate-K | 4.7 | 4.8 | 4.5 | 4.5 | 4.5 |

Notes:
(1)Proportion are weight percent. Used as 20 percent aqueous emulsion when adding.
(2)POE = polyoxyethylenation: ( ) figures = number of mols added. PEG = polyethylene glycol.
(3)Epikote 812 is a trade name of Shell Chemical Company; an epoxy compound the principal ingredient of which is glycerin diglycidyl ether.

ACTUAL EXAMPLE 1

Polyethylene terephthalate (PET) with an intrinsic viscosity of 0.95 was spun using an extruder-type molten spinner at a melting temperature of 290° C., a rate of extruding of 450 grams per minute, and a winding rate of 450 meters per minute. While doing this, the oils, Numbers 1-7 shown in Table 1, were added as spinning oils (spin finish) so that the quantity of active ingredients added was 0.9 weight percent.

Next, it was drawn and heat-treated using a two-stage drawing machine composed of a No. 1 roller (100° C.), a No. 2 roller (100° C.), a hot plate (240° C.), a No. 3 roller (230° C.), and a winding roller. The time of passage over the hot plate was 0.2 second, the time of actual treatment with the No. 3 roller was 0.2 second, the total drawing ratio was 6.0-fold, and the winding rate was 200 meters per minute. A PET fiber of 1500 denier per 192 filaments was obtained.

The fiber obtained was twisted to form the raw cord and then dip-treated with the RFL solution. The results obtained when the adhesive force of this treated cord and the rubber was measured are shown in Table 2.

TABLE 2

| Oil Number | Adhesive Force (kg/cm) | Note |
|---|---|---|
| 1 | 17.9 | Example of this invention |
| 2 | 17.4 | Example of this invention |
| 3 | 17.2 | Example of this invention |
| 4 | 17.5 | Example of this invention |
| 5 | 11.9 | Comparison example |
| 6 | 11.5 | Comparison example |
| 7 | 10.3 | Comparison example |

ACTUAL EXAMPLE 2

Using oils Numbers 8-11 shown in Table 1 as the spinning oils (spin finish), the same tests were performed as in Actual Example 1, except that the temperature of the hot plate during drawing was 230° C., and the temperature of the No. 3 roller was 220° C.

The results of measuring the adhesive force are shown in Table 3.

TABLE 3

| Oil Number | Adhesive Force (kg/cm) | Note |
|---|---|---|
| 8 | 17.6 | Example of this invention |
| 9 | 18.0 | Example of this invention |
| 10 | 17.7 | Example of this invention |
| 11 | 17.6 | Example of this invention |

By comparing Actual Examples 1 and 2, it is seen that by using a polymerization catalyst with the oil, the same or greater adhesive force is obtained even with a low drawing temperature.

ACTUAL EXAMPLE 3

A spun PET yarn with an intrinsic viscosity of 0.90 was drawn immediately, without winding, in two stages on a spindraw apparatus consisting of a No. 1 roller (separator roller added), a No. 2 roller (Nelson roller 150° C.), a No. 3 roller (Nelson roller 100° C.), a No. 4 roller (Nelson roller 210° C.), and a No. 5 roller (separator roller added, 230° C.). The total drawing ratio was 6.0 times, and it was finally wound at a rate of 1000 meters/minute. A 1500 denier/192 filament PET fiber was produced. During this process, a straight oil composed principally of low-viscosity mineral oil, coconut oil, etc., was added to the spun yarn at 0.5 weight percent. In addition, oil No. 8 of Table 1 was added at 1.0 weight percent between No. 4 roller and No. 5 roller, and heat treatment of 0.1 second was performed at No. 5 roller. The adhesive force of the cord obtained was 16.2 kg/cm.

I claim:

1. A method of manufacturing polyester fibers with good adhesiveness to rubber comprising, in the process of making polyester fiber into yarn, yarn-making oil (spin finish) containing an epoxy compound and an alkylene oxide adduct of an amine compound containing an alkoxysilane group is added to the polyester fiber, and then heat-treating the yarn.

2. A method of manufacturing polyester fibers with good adhesiveness to rubber comprising, in the process of spinning polyester fiber, a yarn-making oil (spin finish) containing an epoxy compound, an alkylene oxide adduct of an amine compound, and a polymerization catalyst with an alkoxysilane group is added to the polyester fiber, and then heat-treating the yarn.

3. The method of claim 2 wherein the heat treatment temperature is lowered.

4. The method of claim 3 wherein the temperature is from between about 150° C. to 250° C. for 0.05 to several seconds.

5. The method of claim 4 wherein the heat treatment time corresponds to the drawing process time.

6. The method of claim 2 wherein the catalyst is selected from the group consisting of lithium nitrate, calcium nitrate, zinc nitrate, sodium borofluoride, and zinc borofluoride.

7. The method of claim 1 wherein said epoxy compound is the reaction product of a halogen-containing epoxy compound with a polyhydric alcohol or a polyhydric phenol.

8. The method of claim 7 wherein the polyhydric alcohol is selected from the group consisting of glycerol, ethylene glycol, diethylene glycol, propylene glycol, sorbitol, polyethylene glycol, polypropylene glycol, trimethylol propane, and their derivatives.

9. The method of claim 7 wherein the polyhydric phenol is selected from the group consisting of resorcinol, catechol, hydroquinone, and their derivatives.

10. The method of claim 7 wherein the epoxy compound contains at least one alkoxysilane group.

11. The method of claim 1 wherein the epoxy compound is obtained by oxidizing the unsaturated bonds with peracetic acid.

12. The method of claim 1 wherein the epoxy compound is cyclohexane epoxide.

13. The method of claim 1 wherein the epoxy compound is a diglycidyl ether.

14. The method of claim 1 wherein the aminosilane compound is selected from the group consisting of at least one alkylene oxide reacted with at least one compound of the formulas

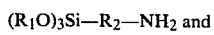

where $R_1$ is a lower alkyl group, and $R_2$ and $R_3$ are alkylene groups.

15. The method of claim 14 wherein less than 50 alkylene oxide mols are added.

16. The method of claim 1 wherein the ingredients of the yarn-making oil (spin finish) are 20-70 weight percent lubricating agent, 5-50 weight percent epoxy compound, 3-30 weight percent aminosilane compound, 0.01-2 weight percent polymerization catalyst, 10-50 weight percent emulsifier, and suitable quantities of the other additives to make 100 weight percent.

17. The method of claim 1 wherein the total quantity of oil on yarn is about 0.2-2 weight percent.

* * * * *